US012506676B2

(12) United States Patent
Hofman-Bang et al.

(10) Patent No.: US 12,506,676 B2
(45) Date of Patent: Dec. 23, 2025

(54) METHOD AND APPARATUS FOR SCHEDULING PACKETS FOR TRANSMISSION

(71) Applicant: Marvell Israel (M.I.S.L) Ltd., Yokneam (IL)

(72) Inventors: Joergen P.R. Hofman-Bang, Ballerup (DK); Jacob Jul Schroder, Lyngby (DK); Itay Shlomo Peled, Hagor (IL); Rami Zemach, Givat Shapira (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 468 days.

(21) Appl. No.: 17/956,478

(22) Filed: Sep. 29, 2022

(65) Prior Publication Data

US 2023/0096238 A1 Mar. 30, 2023

Related U.S. Application Data

(60) Provisional application No. 63/250,189, filed on Sep. 29, 2021.

(51) Int. Cl.
*H04L 12/40* (2006.01)
*H04J 3/08* (2006.01)
(Continued)

(52) U.S. Cl.
CPC .............. *H04L 45/00* (2013.01); *H04L 47/50* (2013.01); *H04L 63/0428* (2013.01)

(58) Field of Classification Search
CPC ................ H04L 45/00; H04L 49/3027; H04L 12/40006; H04L 12/4015; H04L 47/50;
(Continued)

(56) References Cited

U.S. PATENT DOCUMENTS 6,507,592 B1 * 1/2003 Hurvig ............... H04N 21/4385
375/E7.021
8,644,352 B1 * 2/2014 Hutchison ............. H04L 47/283
709/248

(Continued)

FOREIGN PATENT DOCUMENTS

EP 3678336 A2 * 7/2020 ....... H04L 12/40006

OTHER PUBLICATIONS

International Search Report and Written Opinion for PCT Application No. PCT/IB2022/059316, mailed Nov. 23, 2022. (12 pages).

*Primary Examiner* — Sithu Ko
*Assistant Examiner* — Anneilian Lalchinthang

(57) ABSTRACT

A network device transfers packets from a packet memory to one or more network interfaces for transmission by the one or more network interfaces. The transferring of packets includes transferring the packets via one or more respective transmit data paths that correspond to one or more respective network interfaces. The network device measures one or more respective amounts of time required to transmit respective packet data within the one or more respective transmit data paths. The network device uses the one or more respective measured amounts of time to determine when to start transfer of packets from the packet memory to the one or more network interfaces via the one or more respective transmit data paths.

21 Claims, 4 Drawing Sheets

(51) Int. Cl.
*H04J 3/24* (2006.01)
*H04L 9/40* (2022.01)
*H04L 12/26* (2006.01)
*H04L 45/00* (2022.01)
*H04L 47/50* (2022.01)

(58) Field of Classification Search
CPC . H04L 47/562; H04L 45/121; H04L 43/0858; H04L 47/00; H04L 47/566; H04L 49/3009; H04L 12/40013; H04L 7/0091; H04L 63/0428; H04L 47/28; H04L 47/283; H04L 47/32; H04W 4/40; H04W 28/0236
USPC ........................................................ 370/216
See application file for complete search history.

(56) References Cited

U.S. PATENT DOCUMENTS

| | | | | |
|---|---|---|---|---|
| 9,304,961 | B2* | 4/2016 | Schroder | H04L 49/254 |
| 9,882,823 | B2* | 1/2018 | Pannell | H04J 3/0697 |
| 9,960,872 | B2* | 5/2018 | Pannell | H04J 3/0697 |
| 9,998,380 | B2* | 6/2018 | Pannell | H04L 47/628 |
| 9,998,434 | B2* | 6/2018 | Verzun | H04L 9/34 |
| 2006/0256720 | A1* | 11/2006 | Curran-Gray | H04L 41/145 |
| | | | | 370/235 |
| 2007/0174511 | A1* | 7/2007 | Yu | G06F 13/28 |
| | | | | 710/36 |
| 2009/0157236 | A1* | 6/2009 | Van Gaasbeck | G05B 15/02 |
| | | | | 701/3 |
| 2010/0215057 | A1* | 8/2010 | Frink | H04N 21/643 |
| | | | | 370/474 |
| 2015/0016466 | A1* | 1/2015 | Lin | H04L 47/6245 |
| | | | | 370/412 |
| 2018/0191601 | A1* | 7/2018 | Micallef | H04L 43/0858 |

* cited by examiner

METHOD AND APPARATUS FOR SCHEDULING PACKETS FOR TRANSMISSION

CROSS REFERENCES TO RELATED APPLICATIONS

This application claims the benefit of U.S. Provisional Patent App. No. 63/250,189, entitled "Jitter Latency Elimination in Time Division Multiplexing (TDM) Datapath," filed on Sep. 29, 2021, the disclosure of which is hereby expressly incorporated herein by reference in its entirety.

FIELD OF TECHNOLOGY

The present disclosure relates generally to communication networks, and more particularly to scheduling transmission of packets in a network device.

BACKGROUND

The Institute of Electrical and Electronics Engineers (IEEE) 802.1Qbv standard is a time-division multiple access (TDMA) scheme for defining time slots for an Ethernet transmission medium and reserving time slots for different traffic classes. For example, some time slots are reserved for transmission of time-critical packets whereas other time slots are for transmitting packets with lower priorities. With a network device operating according to the IEEE 802.1Qbv standard, the network device must ensure that its transmission of lower priority packets ends before a time slot reserved for time-critical packets begins.

In a typical network device, there is a variable latency between when the network device dequeues a packet for transmission and when transmission of the packet begins "on the wire." A difference between a maximum (or worst case) latency and a minimum (or best case) latency is sometimes referred to as "jitter." The network device must assume a worst case latency when determining whether transmission of a packet will end before the beginning of a next time slot reserved for time-critical packets begins and thus whether the packet can be dequeued for transmission in a current time slot. Because the network device must assume the worst case latency, there is often unused transmission time on the Ethernet transmission medium prior to the beginning of a time slot reserved for time-critical packets, which reduces the overall throughput.

SUMMARY

In an embodiment, a network device comprises: a plurality of network interfaces configured to transmit and receive packets via communication links communicatively coupled to the plurality of network interfaces; a packet processor configured to process packets received via the plurality of network interfaces, including processing at least headers of packets to determine network interfaces to which packets are to be forwarded; a packet memory to store packet data corresponding to packets received via the plurality of network interfaces while the packets are processed by the packet processor, one or more transmit data paths corresponding to one or more respective network interfaces among the plurality of network interfaces, the one or more transmit data paths configured to transfer packet data to the one or more network interfaces for transmission by the one or more network interfaces on one or more respective communication links; and scheduling control circuitry configured to i) measure one or more respective amounts of time required for the one or more respective network interfaces to transmit respective packet data within the one or more respective transmit data paths, and ii) use the one or more respective measured amounts of time to determine when to start transfer of packets from the packet memory to the one or more network interfaces via the one or more respective transmit data paths.

In another embodiment, a method for scheduling packets for transmission in a network device includes: transferring packets to one or more network interfaces for transmission by the one or more network interfaces, the transferring including transferring the packets via one or more respective transmit data paths that correspond to one or more respective network interfaces; measuring one or more respective amounts of time required to transmit respective packet data within the one or more respective transmit data paths; and using the one or more respective measured amounts of time to determine when to start transfer of packets from a packet memory to the one or more network interfaces via the one or more respective transmit data paths.

DETAILED DESCRIPTION

In embodiments described below, a network device, such as a switch, router, etc., includes a plurality of network interfaces configured to receive and transmit packets, and a packet memory to store packet data corresponding to packets received by the network device while the network device analyzes the packets to determine network interfaces to which the packets are to be forwarded for transmission. A plurality of transmit data paths are configured to transfer packet data from the packet memory to respective network interfaces. The network device is configured to measure respective amounts of time required for the respective network interfaces to transmit respective packet data within the one or more respective transmit data paths, and to use the respective measured amounts of time to determine when to start transfer of packets from the packet memory to the network interfaces via the respective transmit data paths. In some embodiments, the use of such measured amounts of time reduces an amount of jitter regarding latency between when the network device dequeues a packet for transmission and when transmission of the packet by a network interface begins. In some embodiments, the reduction in latency reduces an amount of unused transmission time on the Ethernet transmission medium and improves throughput.

Figure 1:
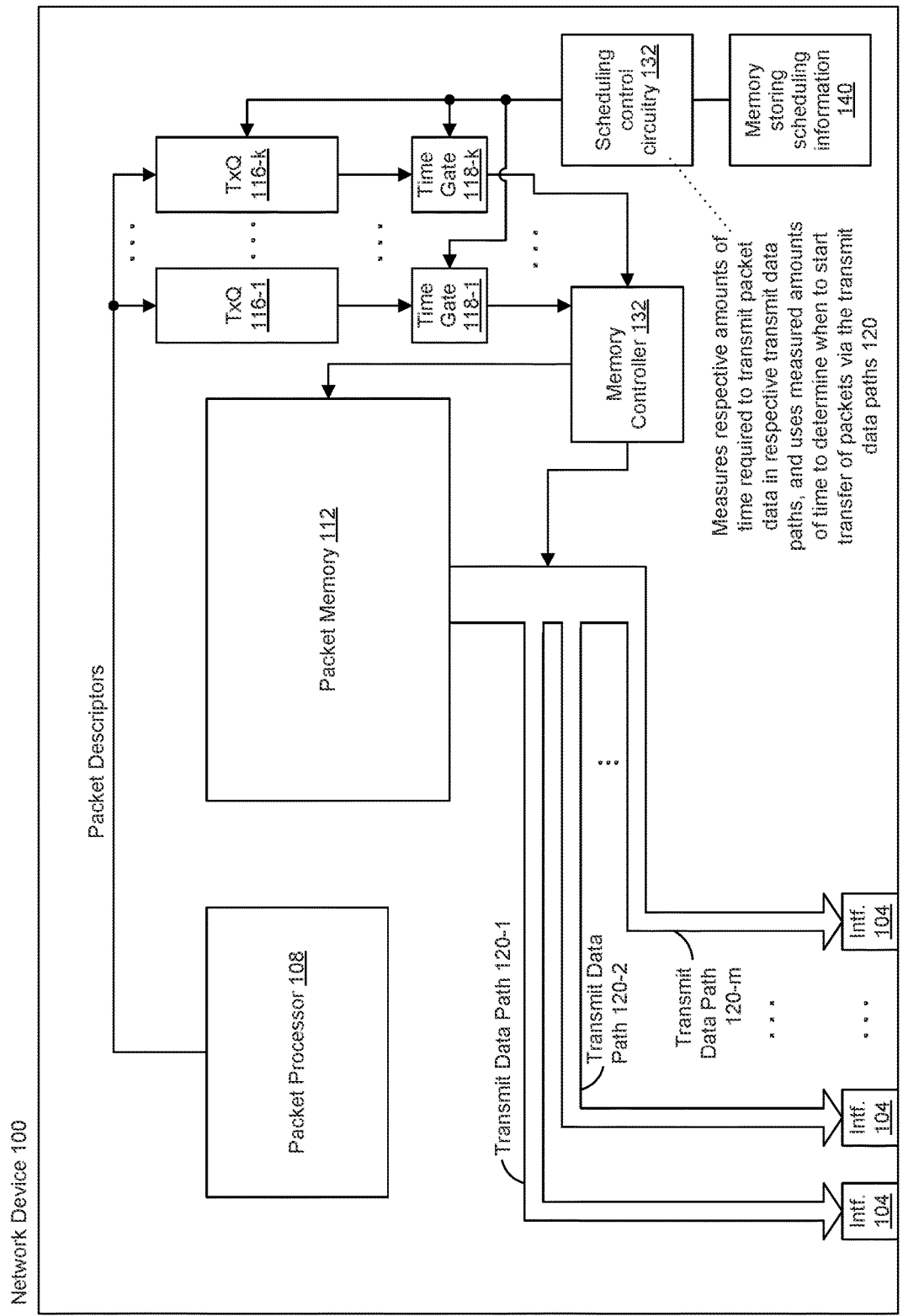
FIG. 1 is a simplified block diagram of an example network device that measure respective amounts of time required for respective network interfaces to transmit respective packet data within respective transmit data paths of the network device, according to an embodiment.

FIG. 1 is a simplified block diagram of an example network device 100 that receives packets, processes the packets to determine network links via which the packets are to be forwarded, and transmits the packets via the determined network links, according to an embodiment. The network device is a network switch, a network router, or another suitable network device.

The network device 100 includes a plurality of network interfaces 104 configured to couple to respective communication links to transmit and receive packets via the communication links. The network device 100 also includes a packet processor 108 that is configured to process packets, for example by analyzing at least header information in the packets to determine network interfaces 104 via which packets are to be transmitted (referred to herein as "target network interfaces"), in an embodiment. As merely an illustrative example, the packet processor 108 is configured to use at least a destination address in a header of a packet to perform a lookup in a forwarding database (not shown), which stores correspondences between destination addresses and network interfaces 104, to determine a target network interface 104 for the packet. As another illustrative example, the packet processor 108 is configured to use at least a VLAN ID in a header of a packet to perform a lookup in a forwarding database (not shown) (e.g., the same forwarding database discussed above or a different forwarding database), which stores correspondences between VLAN IDs and network interfaces 104, to determine a particular set of one or more target network interfaces 104 for the packet.

In various embodiments, the packet processor 108 is configured to perform one or more other operations for packets received by the network device 100, such as one or more of i) header modification (e.g., add a tunneling header, remove a tunneling header, modify one or more network addresses, etc.), ii) ingress and/or egress policing, iii) traffic shaping, etc.

The network device 100 also includes a packet memory 112 configured to store packet data (e.g., at least payloads) corresponding to received packets while the packets are processed by the packet processor 108, in an embodiment.

The network device 100 further includes transmit queues 116 for scheduling the transmission of packets via the network interfaces 104. The transmit queues 116 comprise first-in-first-out (FIFO) queues, according to some embodiments. In an embodiment, a respective set of one or more transmit queues 116 corresponds to a respective network interface 104. For example, a set of different transmit queues 116 corresponds to a single network interface 104, with each transmit queue 116 in the set corresponding to a different priority level according to which packets are to be transmitted via the single network interface 204.

When the packet processor 108 has determined a network interface 104 to which a packet is to be forwarded, the packet processor 108 stores a packet descriptor corresponding to the packet in a transmit queue 116 corresponding to the network interface 104. In embodiments in which multiple transmit queues 116 correspond to the network interface 104 and the multiple transmit queues 116 correspond to respective priority levels, the packet processor 108 stores the packet descriptor in one of the multiple transmit queues 116 that corresponds to a priority level of the packet.

A packet descriptor corresponding to a packet includes information that indicates one or more locations of packet data corresponding to the packet in the packet memory 112, according to some embodiments. In some embodiments, a header portion of the packet and a remaining portion of the packet are stored separately in the packet memory 112, and the packet descriptor includes a first indicator of a first location of the header portion and a second indicator of a second location of the remaining portion. In other embodiments, header portion of the packet is stored in the packet descriptor, and the packet descriptor also includes an indicator of a second location of the remaining portion of the packet in the packet memory 112.

In some embodiments, the packet descriptor also includes information that indicates a length of packet data corresponding to the packet that is stored in the packet memory 112. In some embodiments in which the header portion of the packet and the remaining portion of the packet are stored separately in the packet memory 112, the packet descriptor includes a first indicator of a first length of the header portion and a second indicator of a second length of the remaining portion. In some embodiments in which the header portion of the packet is stored in the packet descriptor and the remaining portion of the packet is stored in the packet memory 112, the packet descriptor includes a first indicator of a first length of the header portion and a second indicator of a second length of the remaining portion.

Dequeueing of a packet descriptor from a transmit queue 116 generally initiates transfer of packet data corresponding to the packet descriptor from the packet memory 112 to a network interface 104 that is to transmit the packet.

The network device 100 also comprises time gates 118 coupled to respective transmit queues 116 among the plurality of transmit queues 116. Each time gate 118 controls whether a packet descriptor that was dequeued from the respective transmit queue 116 can be released to initiate transfer of packet data transmission of a corresponding packet. As will be discussed further below, the time gates 118 are used to control the release of packet descriptors of particular transmit priorities during certain time slots defined according to a schedule.

The network device 100 also includes transmit data paths 120 corresponding to respective network interfaces 104. The transmit data paths 120 are configured to transfer packet data from the packet memory 112 to the network interfaces 104 for transmission by the network interfaces 104. In embodiments in which header portions of packets are stored in packet descriptors in the transmit queues 116, the transmit data paths 120 are also configured to transfer packet data (e.g., header portions of packets) retrieved from the transmit queues 116 to the network interfaces 104 for transmission by the network interfaces 104.

Each of at least some of the transmit data paths 120 is configured to change a length of packet data provided to the transmit data path 120. For example, each of at least some of the transmit data paths 120 is configured to encrypt packet data that was provided to the transmit data path 120 in a manner that increases a length of the packet data, according to an embodiment. As another example, each of at least some of the transmit data paths 120 is configured to decrypt packet data that was provided to the transmit data path 120 in a manner that decreases a length of the packet data, according to an embodiment. As another example, each of at least some of the transmit data paths 120 is configured to add telemetry data (e.g., a timestamp or other timing information, flow control information, etc.) to packet data that was provided to the transmit data path 120, according to an embodiment. As another example, each of at least some of the transmit data paths 120 is configured to remove telemetry data (e.g., a timestamp or other timing information, flow control information, etc.) from packet data that was provided to the transmit data path 120, according to an embodiment.

The network device 100 further includes a scheduling control circuitry 132 that is configured to control release of packet descriptors in the transmit queues 116. In an embodiment, the scheduling control circuitry 132 initiates the transfer of packet data corresponding to a packet by dequeuing a packet descriptor from one of the transmit queues 116.

Additionally, the scheduling control circuitry 132 is configured to control the time gates 118 using scheduling information stored in a memory 140. The scheduling control circuitry 132 is configured to use i) a current time generated by a clock (not shown) and ii) time schedule information in the memory 140 to generate control signals that control when each time gate 118 permits transfer of packet descriptors.

The scheduling control circuitry 132 is also configured to, for each of at least some of the transmit data paths 120, measure an amount of time required for the corresponding network interface 104 to transmit packet data already within the transmit data path 120. In some embodiments, the scheduling control circuitry 132 is configured to, for each of at least some of the transmit data paths 120, measure an amount of time required for the corresponding network interface 104 to transmit i) first packet data already within the transmit data path 120 and ii) second packet data in the packet memory 112 that corresponds to a packet for which first packet data is already within the transmit data path 120. This is useful, for example, for the scheduling control circuitry 132 to ensure that transmission of packet data by the network interface 104 stops at a particular time. For instance, as described above, an implementation of the IEEE 802.1Qbv standard may require that transmission of lower priority packets ends before a time slot reserved for time-critical packets begins. Thus, in an embodiment in which the network device 100 is configured to implement the IEEE 802.1Qbv standard, the scheduling control circuitry 132 is configured to, for each of at least some of the transmit data paths 120, use the measured amount of time required for the corresponding network interface 104 to transmit packet data already within the transmit data path 120 to determine whether another low-priority packet can be dequeued (from a corresponding transmit queue 116) and transmitted by the network interface 104 before a next time slot reserved for time-critical packets begins.

More generally, the scheduling control circuitry 132 is configured to, for each of at least some of the transmit data paths 120, use the measured amount of time required to transmit packet data already in the transmit data path 120 to determine when to start transfer of another packet corresponding to packet data in the packet memory 112 to the network interface 104 via the transmit data path 120. For example, the scheduling control circuitry 132 is configured to use the measured amount of time required to transmit packet data already in the transmit data path 120 to determine whether i) another packet can be transmitted before a next time slot begins, or ji) transmission of the other packet should wait until a later time, such as when the next time slot ends. In response to determining that the other packet can be transmitted before the time slot begins, the scheduling control circuitry 132 dequeues a packet descriptor from a corresponding transmit queue 116; and in response to determining that the other packet cannot be transmitted before the time slot begins, the scheduling control circuitry 132 waits to dequeue the packet descriptor from the corresponding transmit queue 116 until a later time.

In some embodiments, measuring the amount of time required for the corresponding network interface 104 to transmit first packet data already within the transmit data path 120 (and optionally second packet data in the packet memory 112 that corresponds to a packet for which first packet data is already within the transmit data path 120) includes accounting for a change in a length of the packet data that will occur in the transmit data path 120. For example, as discussed above, when a transmit data path 120 encrypts or decrypts packet data that was provided to the transmit data path 120 in a manner that changes a length of the packet data, measuring the amount of time required for transmission includes accounting for the change in the length of the packet data resulting from the encryption/decryption, according to an embodiment. As another example, when a transmit data path 120 adds telemetry data to packet data that was provided to the transmit data path 120, measuring the amount of time required for transmission includes accounting for the change in the length of the packet data resulting from the addition of the telemetry data, according to an embodiment.

In some embodiments, measuring the amount of time required for the corresponding network interface 104 to transmit first packet data already within the transmit data path 120 (and optionally second packet data in the packet memory 112 that corresponds to a packet for which first packet data is already within the transmit data path 120) additionally or alternatively includes accounting for one or more IPGs that are to be included between packets in the transmit data path.

The network device also comprises a memory controller 152 that is configured to transfer packet data corresponding to the packet descriptor from the packet memory 112 to the network interfaces 104 via the transmit data paths 120. In an embodiment, the memory controller 152 receives packet descriptors dequeued from the transmit queues 116. As discussed above, the packet descriptor includes indication(s) of location(s) of packet data in the packet memory 112, and the memory controller 152 uses the indication(s) of location (s) of packet data in the packet memory 112 to retrieve the packet data from the packet memory 112 and provide the packet data to the transmit data path 120 corresponding to the network interface 104 that is to transmit the packet. In embodiments in which the packet descriptor includes a header portion of the packet, the memory controller 152 retrieves the header portion of the packet from the packet descriptor and provides the header portion to the transmit data path 120.

Figure 2:
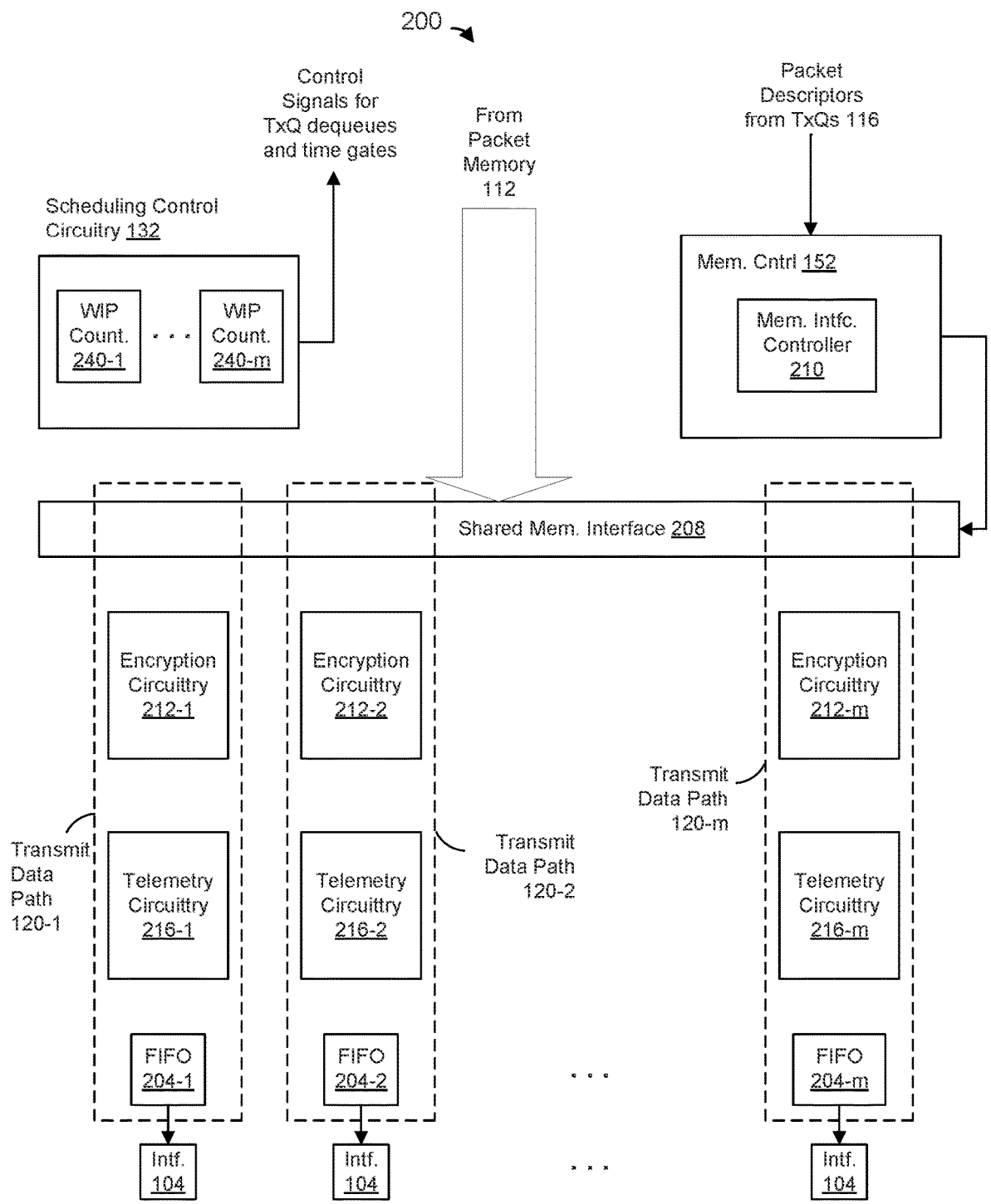
FIG. 2 is a simplified block diagram illustrating in more detail an example of transmit data paths of the network device of FIG. 1, according to an embodiment

FIG. 2 is a simplified block diagram illustrating an example of the transmit data paths 120 of the network device 100 of FIG. 1 in more detail, according to an embodiment. In other embodiments, the transmit data paths 120 of the network device 100 of FIG. 1 have a suitable structure different than the example illustrated in FIG. 2. In some embodiments, the example transmit data paths 120 are used in another suitable network device different than the network device 100 of FIG. 1.

Each transmit data path 120 includes a FIFO buffer 204 coupled to the corresponding network interface 104. Each FIFO buffer 204 is configured to buffer packet data prior to transmission by the corresponding network interface 104. In an embodiment, each FIFO queue 204 comprises a respective plurality of entries, and each entry has a width of multiple bytes (referred to herein as a "word"). In a word of the FIFO queue 204 corresponding to an end of a packet, the word typically is only partially filled with packet data, and remaining bytes in the word are stored with bytes set to a reserved value that indicates the bytes are invalid and do not include packet data.

In an embodiment, each FIFO buffer 204 is configured to generate a first output that indicates when a fill level of the FIFO buffer 204 exceeds a first threshold. In an embodiment, each FIFO buffer 204 is also configured to generate a second output that indicates when the fill level of the FIFO buffer 204 falls below a second threshold. In an embodiment, the first threshold is the same as the second threshold. In an embodiment, the memory controller 132 is configured to pause sending packet data to the corresponding transmit data path 120 in response to the first output from the corresponding FIFO buffer 204. In embodiments in which each FIFO buffer 204 is also configured to generate the second output that indicates when the fill level of the FIFO buffer 204 falls below the second threshold, the memory controller 132 is configured to resume sending packet data to the corresponding transmit data path 120 in response to the second output from the corresponding FIFO buffer 204.

A varying of the fill level of a FIFO buffer 204 during operation leads to jitter in a latency of the transmit data path 120.

In an embodiment, the transmit data paths 120 use a shared memory interface 208 to transfer packet data from the packet memory 112 to the FIFOs 204. In an embodiment, the shared memory interface 208 comprises a shared bus. In another embodiment, the shared memory interface 208 comprises a crossbar. In other embodiments, the shared memory interface 208 comprises another suitable shared memory interface different than a shared bus and a crossbar. The shared memory interface 208 is shared amongst the transmit data paths 120 using a time division multiplexing (TDM) scheme, according to an embodiment.

The memory controller 152 includes a memory interface controller 210 configured to control the shared memory interface 208 to transfer packet data from the packet memory 112 to the transmit data paths 120 according to the TDM scheme. In some embodiments in which packet descriptors in the transmit queues 116 include header portions of packets, the memory controller 132 is configured to control the shared memory interface 208 to transfer the header portions to the transmit data paths 120 according to the TDM scheme.

In some embodiments, each of at least some of the transmit data paths 120 includes encryption and/or decryption circuitry 212 (sometimes referred to herein as the "encryption/decryption circuitry 212") that is configured to encrypt and/or decrypt packet data that was provided to the transmit data path 120. In some embodiments, encryption of the packet data performed by the encryption/decryption circuitry 212 increases a length of the packet data. In some embodiments, decryption of the packet data performed by the encryption/decryption circuitry 212 decreases a length of the packet data. In other embodiments, each of at least some of the transmit data paths omits the encryption/decryption circuitry 212.

In some embodiments, each of at least some of the transmit data paths 120 includes telemetry circuitry 216 that is configured to add telemetry data (e.g., a timestamp or other timing information, flow control information, etc.) to packet data that was provided to the transmit data path 120, according to an embodiment. In other embodiments, each of at least some of the transmit data paths omits the telemetry circuitry 216.

The scheduling control circuitry 132 includes a respective work in progress (WIP) counter 240 for each of at least some of the transmit data paths 120. The scheduling control circuitry 132 is configured to use each WIP counter 240 to measure an amount of time required for the corresponding network interface 104 to transmit packet data already within the transmit data path 120. In some embodiments, the scheduling control circuitry 132 is configured to use each WIP counter 240 to measure an amount of time required for the corresponding network interface 104 to transmit i) packet data already within the transmit data path 120 and ii) second packet data in the packet memory 112 that corresponds to a packet for which first packet data is already within the transmit data path 120, i.e., packet data in the packet memory 112 corresponding to a packet that the memory controller 152 has already begun transferring to the transmit data path 120.

In some embodiments, the scheduling control circuitry 132 is configured to use each WIP counter 240 to measure the amount of time required for transmission to account for a change in a length of the packet data that will occur in the corresponding transmit data path 120. For example, when encryption/decryption circuitry 212 is included in the transmit data path 120 and encryption or decryption changes a length of the packet data, the scheduling control circuitry 132 is configured to use the WIP counter 240 to measure the amount of time required for transmission to account for the change in the length of the packet data resulting from the encryption or decryption, according to an embodiment. As another example, when telemetry circuitry 216 is included in the transmit data path 120, the scheduling control circuitry 132 is configured to use each WIP counter 240 to measure the amount of time required for transmission to account for the change in the length of the packet data resulting from the addition or removal of the telemetry data, according to an embodiment.

In some embodiments, the scheduling control circuitry 132 is configured to use each WIP counter 240 to measure the amount of time required for transmission to account for one or more IPGs that are to be included between packets in the corresponding transmit data path 120.

Figure 3:
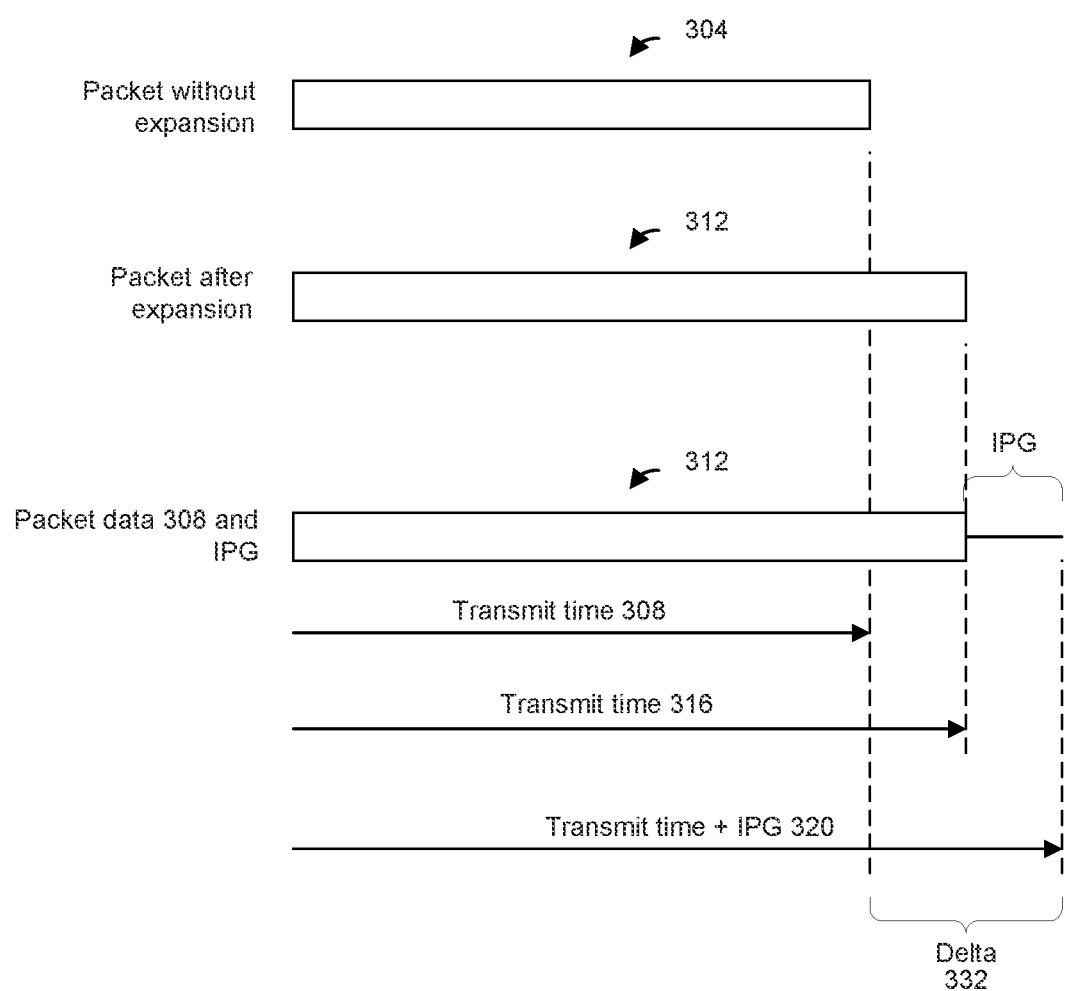
FIG. 3 is timing diagram illustrating times required for transmitting packet data, according to an embodiment.

FIG. 3 is timing diagram illustrating times required for transmitting packet data, according to an embodiment. In FIG. 3, time increases from left to right.

For a packet 304 without any change in length of packet data of the packet (e.g., no encryption or decryption, no addition or removal of telemetry data, etc.), a time 308 would be required to transmit the packet 304. However, if the packet data of the packet 304 is expanded, for example due to encryption and/or addition of telemetry data, to generate an expanded packet 312, a time 316 would be required to transmit the expanded packet 312. Additionally, if an IPG after the expanded packet 312 is taken into account, a time 320 is required before another packet can begin transmission.

Thus, there is a difference or delta 332 between the time 308 required to transmit the packet without any expansion and the time 320 required for transmission of the expanded packet 312 and the IPG.

Referring again to FIG. 2, the scheduling control circuitry 132 is configured to, in response to deciding to begin transmission of a packet via one of the network interfaces 104, increment the corresponding WIP counter 240 by an amount that corresponds to a time required for the network interface 104 to transmit the packet, according to an embodiment. In an embodiment, the amount that corresponds to a time required for the network interface 104 to transmit the packet equals a sum of i) a length of packet data corresponding to the packet prior to providing the packet data to the corresponding transmit data path 120, ii) a change length value corresponding to a change in the length of the packet data to occur (if any) in the transmit data path 120, e.g., due to encryption, decryption, addition or removal of telemetry data, etc., and iii) an IPG after an end of the transmission of the packet.

In another embodiment, the scheduling control circuitry 132 is configured to, in response to the memory controller 152 transferring an amount of packet data to a transmit data path 120, increment the corresponding WIP counter 240 by the amount of packet data transferred; and in connection with transferring packet data corresponding to an end of the packet, increment WIP counter 240 by i) a length of the packet data corresponding to the end of the packet, ii) a length change value corresponding to an increase in the length of the packet data to occur (if any) in the transmit data path 120, e.g., due to encryption, decryption, addition or removal of telemetry data, etc., and iii) an IPG after an end of the transmission of the packet.

In an embodiment, the scheduling control circuitry 132 is configured to monitor the FIFOs 204 and is configured to, when a word of packet data is removed from a FIFO 204 for transmission by the network interface 104, decrement the corresponding WIP counter 240 by the amount of packet data removed from the FIFO 204. In some embodiments, invalid bytes in the word of packet data removed from the FIFO 204 are ignored when decrementing the WIP counter 240. For example, if a word removed from the FIFO 204 includes x bytes, with 2 of the x bytes being invalid bytes, the WIP counter 240 is decremented by x−2.

In an embodiment, when a word of packet data removed from the FIFO 204 includes an end-of-packet (EOP) indication, the scheduling control circuitry 132 is configured to additionally decrement the WIP counter 240 by an amount that corresponds to a transmit time of an IPG.

When the WIP counter 240 is incremented and decremented in the manner described above, the value of the WIP counter 240 indicates a time required to transmit packet data in the corresponding transmit data path 120 (and optionally to transmit second packet data in the packet memory 112 that corresponds to a packet for which other packet data is already within the transmit data path 120).

The scheduling control circuitry 132 is configured to use the respective measured amounts of time in the WIP counters 240 to determine when to start transfer of packets from the packet memory 112 to the network interfaces 104 via the respective transmit data paths 120. For example, for each of at least some of the transmit data paths 120, the scheduling control circuitry 132 compares a value of the corresponding WIP counter 240 to a threshold, and determines when to start transfer of a next packet to the transmit data path 120 based on the comparison of the value of the corresponding WIP counter 240 to the threshold. In an embodiment, if the value of the corresponding WIP counter 240 is below the threshold the scheduling control circuitry 132 determines that the transmission of the packet can begin; whereas if the value of the corresponding WIP counter 240 is above the threshold the scheduling control circuitry 132 determines that the transmission of the packet is to wait.

Figure 4:
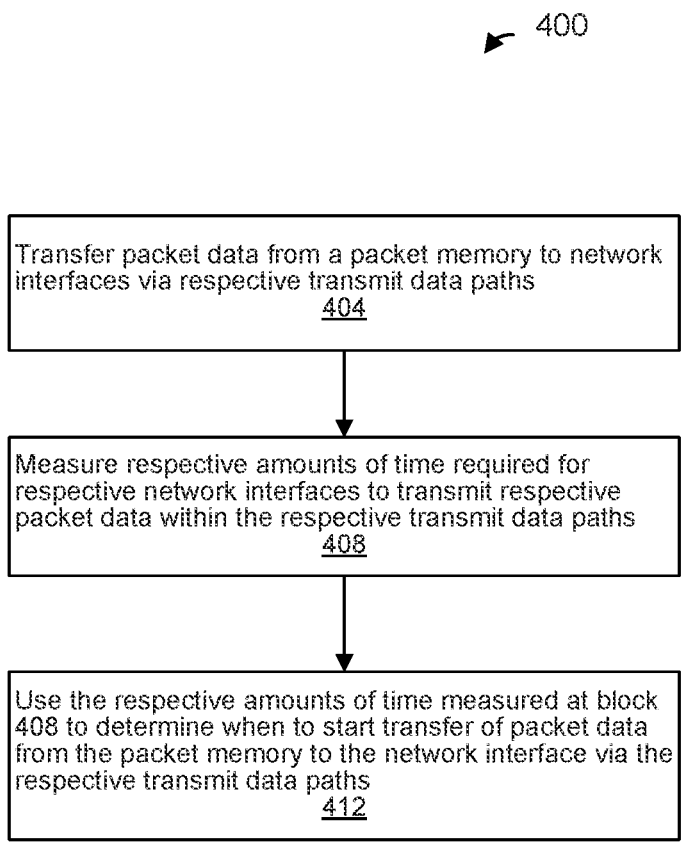
FIG. 4 is a flow diagram of an example method for scheduling packets for transmission in a network device, according to an embodiment.

FIG. 4 is a flow diagram of an example method 400 for scheduling packets for transmission in a network device, according to an embodiment. The method 400 is implemented by the network device 100, in an embodiment, and the method 400 is described with reference to FIGS. 1 and 2 for ease of explanation. In other embodiments, the method 400 is implemented by another suitable network device different than the network device 100. In some embodiments, the network device 100 implements another suitable method different than the method 400.

At block 404, the network device transfers packet data from a packet memory to network interfaces of the network device for transmission by the network interfaces. The transfer of packet data at block 404 includes transferring the packet data via respective transmit data paths that correspond to respective network interfaces. For example, the scheduling control circuitry 132 controls the transfer of packet data from the packet memory 112 to the network interfaces 104 via the transmit data paths 120.

At block 408, the network device measures respective amounts of time required for the respective network interfaces to transmit respective packet data within the one or more respective transmit data paths. For example, the scheduling control circuitry 132 measures respective amounts of time required for the respective network interfaces 104 to transmit respective packet data within the one or more respective transmit data paths 120.

In an embodiment, measuring respective amounts of time at block 408 comprises maintaining respective counters that correspond to respective transmit data paths. In some embodiments, maintaining counters includes for each of one or more of the counters: incrementing the counter to account for packet data that is being added to the transmit data path, and decrementing the counter in connection with transmission of packet data by the network interface.

In some embodiments, maintaining counters comprises, for each of one or more of the counters: incrementing the counter to account for an IPG between packets that are to be transmitted by the network interface; and in connection with the network interface transmitting an end of a packet, decrementing the counter to account for the IPG.

In some embodiments, the method 400 further comprises, for each of one or more transmit data path, processing packet data in the transmit data path to change a length of the packet data; and maintaining the counters comprises, for each of one or more of the counters, adjusting the counter to account for the change of the length of the packet data.

In some embodiments, the method 400 further comprises, for each of one or more transmit data paths, encrypting packet data in a manner that expands the length of the packet data; and maintaining the counters comprises, for each of one or more of the counters, incrementing the counter to account for an expansion of the length of the packet data due to encrypting the packet data.

In some embodiments, the method 400 further comprises, for each of one or more transmit data paths, decrypting packet data in a manner that reduces the length of the packet data; and maintaining the counters comprises, for each of one or more of the counters, adjusting the counter to account for a reduction of the length of the packet data due to encrypting the packet data.

In some embodiments, the method 400 further comprises, for each of one or more transmit data paths, adding telemetry data to the packet data; and maintaining the counters comprises, for each of one or more of the counters, incrementing the counter to account for an expansion of the length of the packet data due to the adding of telemetry data.

In some embodiments, the method 400 further comprises, for each of one or more transmit data paths, removing telemetry data from the packet data, and maintaining the counters comprises, for each of one or more of the counters, adjusting the counter to account for a reduction of the length of the packet data due to the removing of telemetry data.

In some embodiments, maintaining the counters comprises, for each of one or more of the counters: incrementing the counter in connection with dequeuing a packet descriptor corresponding to a packet that is to be transmitted via the corresponding transmit data path.

At block 412, the network device uses the respective measured amounts of time to determine when to start transfer of packets from the packet memory to the network interfaces via the respective transmit data paths. For example, the scheduling control circuitry 132 uses the respective measured amounts of time to determine when to start transfer of packets from the packet memory 112 to the network interfaces 104 via the respective transmit data paths 120.

Embodiment 1: A network device, comprising: a plurality of network interfaces configured to transmit and receive packets via communication links communicatively coupled to the plurality of network interfaces; a packet processor configured to process packets received via the plurality of network interfaces, including processing at least headers of packets to determine network interfaces to which packets are to be forwarded, a packet memory to store packet data corresponding to packets received via the plurality of network interfaces while the packets are processed by the packet processor; one or more transmit data paths corresponding to one or more respective network interfaces among the plurality of network interfaces, the one or more transmit data paths configured to transfer packet data to the one or more network interfaces for transmission by the one or more network interfaces on one or more respective communication links; and scheduling control circuitry configured to i) measure one or more respective amounts of time required for the one or more respective network interfaces to transmit respective packet data within the one or more respective transmit data paths, and ii) use the one or more respective measured amounts of time to determine when to start transfer of packets from the packet memory to the one or more network interfaces via the one or more respective transmit data paths.

Embodiment 2: The network device of embodiment 1, wherein: the scheduling control circuitry comprises one or more respective counters that correspond to one or more respective transmit data paths, and the scheduling control circuitry is configured to use the one or more counters to measure the one or more respective amounts of time required for the one or more respective network interfaces to transmit respective packet data within the one or more respective transmit data paths.

Embodiment 3: The network device of embodiment 2, wherein the scheduling control circuitry is configured to, for each of the one or more counters: increment the counter to account for an interpacket gap (IPG) between packets that are to be transmitted by the network interface; and in connection with the network interface transmitting an end of a packet, decrement the counter to account for the IPG.

Embodiment 4: The network device of either of embodiments 2 or 3, wherein: each of the one or more transmit data paths is configured to process packet data in the transmit data path in a manner that changes a length of the packet data; and the scheduling control circuitry is configured to, for each of the one or more counters, adjust the counter to account for the change of the length of the packet data.

Embodiment 5: The network device of embodiment 4, wherein: each of the one or more transmit data paths includes encryption and/or decryption circuitry configured encrypt and/or decrypt packet data in the transmit data path in a manner that changes the length of the packet data; and the scheduling control circuitry is configured to, for each of the one or more counters, adjust the counter to account for the change of the length of the packet data due to encryption or decryption of the packet data.

Embodiment 6: The network device of either of embodiments 4 or 5, wherein: each of the one or more transmit data paths includes telemetry circuitry configured to add telemetry data to or remove telemetry data from the packet data; and the scheduling control circuitry is configured to, for each of the one or more counters, adjust the counter to account for the change of the length of the packet data due to the adding or removing of telemetry data.

Embodiment 7: The network device of any of embodiments 2-6, further comprising: a plurality of transmit queues configured to store packet descriptors corresponding to packets that are to be transmitted by the network interfaces; wherein the scheduling control circuitry is configured to, for each of the one or more counters, increment the counter in connection with dequeuing a packet descriptor corresponding to a packet that is to be transmitted via the corresponding transmit data path.

Embodiment 8: The network device of embodiment 7, wherein the scheduling control circuitry is configured to, for each of the one or more counters: increment the counter by an amount that corresponds to at least a sum of i) a length of time required to transmit packet data of the packet and ii) an IPG.

Embodiment 9: The network device of either of embodiments 7 or 8, wherein the scheduling control circuitry is configured to, for each of the one or more counters: increment the counter by an amount that corresponds to at least a sum of i) a length of packet data corresponding to the packet being provided to the transmit data path and ii) an increase of length of the packet data that will occur in the transmit data path.

Embodiment 10: The network device of any of embodiments 1-9, further comprising: a shared memory interface that is configured to communicatively couple the packet memory to multiple transmit data paths corresponding to multiple network interfaces; wherein the scheduling control circuitry is configured to control the shared memory interface to transfer packet data from the packet memory to the multiple transmit data paths according to a time division multiplexing (TDM) scheme.

Embodiment 11: The network device of any of embodiments 1-10, wherein the one or more transmit data paths are configured to transfer the packet data from the packet memory to the one or more network interfaces for transmission by the one or more network interfaces.

Embodiment 12: A method for scheduling packets for transmission in a network device, the method comprising: transferring packets to one or more network interfaces for transmission by the one or more network interfaces, the transferring including transferring the packets via one or more respective transmit data paths that correspond to one or more respective network interfaces; measuring one or more respective amounts of time required to transmit respective packet data within the one or more respective transmit data paths; and using the one or more respective measured amounts of time to determine when to start transfer of packets from a packet memory to the one or more network interfaces via the one or more respective transmit data paths.

Embodiment 13: The method for scheduling packets for transmission of embodiment 12, wherein measuring the one or more respective amounts of time required for the one or more respective network interfaces to transmit respective packet data comprises: maintaining one or more respective counters that correspond to one or more respective transmit data paths, including, for each of one or more of the counters: incrementing the counter to account for packet data that is being added to the transmit data path, and decrementing the counter in connection with transmission of packet data by the network interface.

Embodiment 14: The method for scheduling packets for transmission of embodiment 13, wherein maintaining the one or more respective counters comprises, for each of one or more of the counters: incrementing the counter to account for an interpacket gap (IPG) between packets that are to be transmitted by the network interface; and in connection with the network interface transmitting an end of a packet, decrementing the counter to account for the IPG.

Embodiment 15: The method for scheduling packets for transmission of embodiment 13, further comprising, for each of one or more transmit data paths: processing packet data in the transmit data path to change a length of the packet data; wherein maintaining the one or more respective counters comprises, for each of one or more of the counters, adjusting the counter to account for the expansion of the length of the packet data.

Embodiment 16: The method for scheduling packets for transmission of embodiment 15, wherein: for each of one or more transmit data paths, processing packet data in the transmit data path to change the length of the packet data comprises encrypting or decrypting the packet data; and maintaining the one or more respective counters comprises, for each of one or more of the counters, adjusting the counter to account for a change of the length of the packet data due to encrypting or decrypting the packet data.

Embodiment 17: The method for scheduling packets for transmission of embodiment 15, wherein: for each of one or more transmit data paths, processing packet data in the transmit data path to change the length of the packet data comprises adding telemetry data to or removing telemetry data from the packet data; and maintaining the one or more respective counters comprises, for each of one or more of the counters, adjusting the counter to account for a change of the length of the packet data due to the adding or removing of telemetry data.

Embodiment 18: The method for scheduling packets for transmission of embodiment 13, wherein maintaining the one or more respective counters comprises, for each of one or more of the counters: incrementing the counter in connection with dequeuing a packet descriptor corresponding to a packet that is to be transmitted via the corresponding transmit data path.

Embodiment 19: The method for scheduling packets for transmission of embodiment 18, wherein maintaining the one or more respective counters comprises, for each of one or more of the counters: incrementing the counter by an amount that corresponds to at least a sum of i) a length of time required to transmit packet data of the packet and ii) an IPG.

Embodiment 20: The method for scheduling packets for transmission of embodiment 18, wherein maintaining the one or more respective counters comprises, for each of one or more of the counters: incrementing the counter by an amount that corresponds to at least a sum of i) a length of packet data corresponding to the packet being provided to the transmit data path and ii) an increase of length of the packet data that will occur in the transmit data path.

Embodiment 21: The method for scheduling packets for transmission of claim 12, wherein transferring packets to one or more network interfaces for transmission comprises transferring the packets from the packet memory to the one or more network interfaces.

At least some of the various blocks, operations, and techniques described above are suitably implemented utilizing dedicated hardware circuitry, such as one or more of discrete components, an integrated circuit, an application-specific integrated circuit (ASIC), a programmable logic device (PLD), a processor executing firmware instructions, a processor executing software instructions, or any combination thereof. When implemented utilizing a processor executing software or firmware instructions, the software or firmware instructions may be stored in any suitable computer readable memory such as in a random access memory (RAM), a read only memory (ROM), a solid state memory (e.g., Flash memory), etc. The software or firmware instructions may include machine readable instructions that, when executed by one or more processors, cause the one or more processors to perform various acts described herein.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A network device, comprising:
a plurality of network interfaces configured to transmit and receive via communication links communicatively coupled to the plurality of network interfaces, the plurality of network interfaces including a first network interface communicatively coupled to a first communication link among the communication links communicatively coupled to the plurality of network interfaces;
a packet processor configured to process packets received via the plurality of network interfaces, including processing at least headers of the packets to determine a set of network interfaces, among the plurality of network interfaces, to which the packets are to be forwarded;
a packet memory to store packet data corresponding to the packets received via the plurality of network interfaces while the packets are processed by the packet processor;
a transmit data paths corresponding to the first network interfaces, the transmit data path configured to transfer first packet data, amongst the packet data stored in the packet memory, to the first network interface for transmission by the first network interface on the first communication link, the transmit data path including a memory buffer; and
scheduling control circuitry configured to i) measure an amounts of time required for the first network interfaces to transmit a first set of the first packet data that is within the transmit data path including a subset of the first set of the packet data stored in the memory buffer, and ii) use the measured amount of time to determine when to start transfer of a second set of the first packet data from the packet memory to the first network interface via the transmit data path.

2. The network device of claim 1, wherein:
the scheduling control circuitry comprises a counter; and
the scheduling control circuitry is configured to use the counter to measure the amount of time required for the first network interfaces to transmit the first set of the first packet data that is within the transmit data path including the subset of the first set of the first packet data stored in the memory buffer.

3. The network device of claim 2, wherein the scheduling control circuitry is configured to:
increment the counter to account for an interpacket gap (IPG) between a first packet that is to be transmitted by the first network interface and a second packet that is to be transmitted by the first network interface; and
in connection with the first network interface transmitting an end of the first packet, decrement the counter to account for the IPG.

4. The network device of claim 2, wherein:
the transmit data paths is configured to process the first set of the first packet data in the transmit data path in a manner that changes a length of the first set of the first packet data in the transmit data path; and
the scheduling control circuitry is configured to adjust the counter to account for the change of the length of the first set of the first packet data in the transmit data paths.

5. The network device of claim 4, wherein:
the transmit data path includes at leas one of encryption circuitry and decryption circuitry, the at least one of encryption circuitry and decryption circuitry configured to at least one of encrypt and decrypt the first set of the first packet data in the transmit data path in a manner that changes the length of the first set of the first packet data in the transmit data path; and
the scheduling control circuitry is configured to adjust the counter to account for the change of the length of the first set of the first packet data in the transmit data path due to at least one of encryption and decryption of the first set of the first packet data in the transmit data path.

6. The network device of claim 4, wherein:
the transmit data paths includes telemetry circuitry configured to add telemetry data to or remove telemetry data from the first set of the first packet data in the transmit data path; and
the scheduling control circuitry is configured to adjust the counter to account for the change of the length of the first set of the first packet data in the transmit data path due to the adding or removal of telemetry data.

7. The network device of claim 2, further comprising:
a plurality of transmit queues configured to store packet descriptors corresponding to the packets that are to be transmitted by the network interfaces;
wherein the scheduling control circuitry is configured to increment the counter in connection with dequeuing a packet descriptor corresponding to the first packet data that are to be transmitted via the transmit data path.

8. The network device of claim 7, wherein the scheduling control circuitry is configured to:
increment the counter by an amount that corresponds to at least a sum of i) a length of time required to transmit a packet corresponding to the packet descriptor and ii) an IPG.

9. The network device of claim 7, wherein the scheduling control circuitry is configured to:
increment the counter by an amount that corresponds to at least a sum of i) a length of the packet corresponding to the packet descriptor and ii) an increase of length of the packet corresponding to the packet descriptor that will occur in the transmit data path.

10. The network device of claim 1, wherein the transmit data path is a first transmit data path, wherein the plurality of network interfaces includes a set of multiple respective network interfaces that includes the first network interface, and wherein the network device further comprises:
multiple respective transmit data paths that include the first transmit data path, the multiple respective transmit data paths corresponding to the multiple respective network interfaces,
a shared memory interface that is configured to communicatively couple the packet memory to the multiple respective transmit data paths;
wherein the scheduling control circuitry is configured to control the shared memory interface to transfer the packet data from the packet memory to the multiple respective transmit data paths according to a time division multiplexing (TDM) scheme.

11. The network device of claim 1, wherein the transmit data path is configured to transfer the first packet data from the packet memory to the first network interfaces for transmission by the first network interfaces.

12. A method for scheduling packets for transmission in a network device, the method comprising:
transferring packets to one or more network interfaces for transmission by the one or more network interfaces, the transferring including transferring a subset of the packets via a transmit data path that corresponds to a first network interface amongst the one or more network interfaces, the transmit data path including a memory buffer;
measuring an amount of time required to transmit first packet data that is within the transmit data path including a subset of the first packet data stored in the memory buffer; and
using the measured amount of time to determine when to start transfer of second packet data from a packet memory to the first network interface via the transmit data path.

13. The method for scheduling packets for transmission of claim 12, wherein measuring the amount of time required for the first network interfaces to transmit the first packet data within the transmit data path comprises:
maintaining a counter that corresponds to the transmit data path, including:
incrementing the counter to account for additional first packet data that is being added to the transmit data path, and
decrementing the counter in connection with transmission of the first packet data by the first network interface.

14. The method for scheduling packets for transmission of claim 13, wherein maintaining the counter comprises:
incrementing the counter to account for an interpacket gap (IPG) between a first packet and a second packet that are to be transmitted by the first network interface; and
in connection with the network interface transmitting an end of the first packet, decrementing the counter to account for the IPG.

15. The method for scheduling packets for transmission of claim 13, further comprising:
processing the first packet data in the transmit data path to change a length of the first packet data;
wherein maintaining the counter comprises adjusting the counter to account for the change of the length of the first packet data.

16. The method for scheduling packets for transmission of claim 15, wherein:
processing the first packet data in the transmit data path to change the length of the first packet data comprises at least one of encrypting the first packet data and decrypting the first packet data; and
maintaining the counter comprises adjusting the counter to account for a change of the length of the first packet data due to the least one of encrypting the first packet data and decrypting the first packet data.

17. The method for scheduling packets for transmission of claim 15, wherein:
processing the first packet data in the transmit data path to change the length of the first packet data comprises at least one of adding telemetry data to the first packet data and removing telemetry data from the first packet data; and maintaining the counter comprises incrementing the counter to account for a change of the length of the first packet data due to the at least one of adding of telemetry data and removing of telemetry data.

18. The method for scheduling packets for transmission of claim 13, wherein maintaining the counter comprises:
incrementing the counter in connection with dequeuing a packet descriptor corresponding to a first packet that is to be transmitted via the corresponding transmit data path.

19. The method for scheduling packets for transmission of claim 18, wherein maintaining the counter comprises:
incrementing the counter by an amount that corresponds to at least a sum of i) a length of time required to transmit the first packet and ii) an IPG.

20. The method for scheduling packets for transmission of claim 18, wherein maintaining the counter comprises:
incrementing the counter by an amount that corresponds to at least a sum of i) a length of packet data corresponding to the first packet being provided to the transmit data path and ii) an increase of length of the packet data corresponding to the first packet that will occur in the transmit data path.

21. The method for scheduling packets for transmission of claim 12, wherein transferring the packets to the one or more network interfaces for transmission comprises transferring the packets from the packet memory to the one or more network interfaces.

* * * * *